United States Patent Office 3,360,621
Patented Dec. 26, 1967

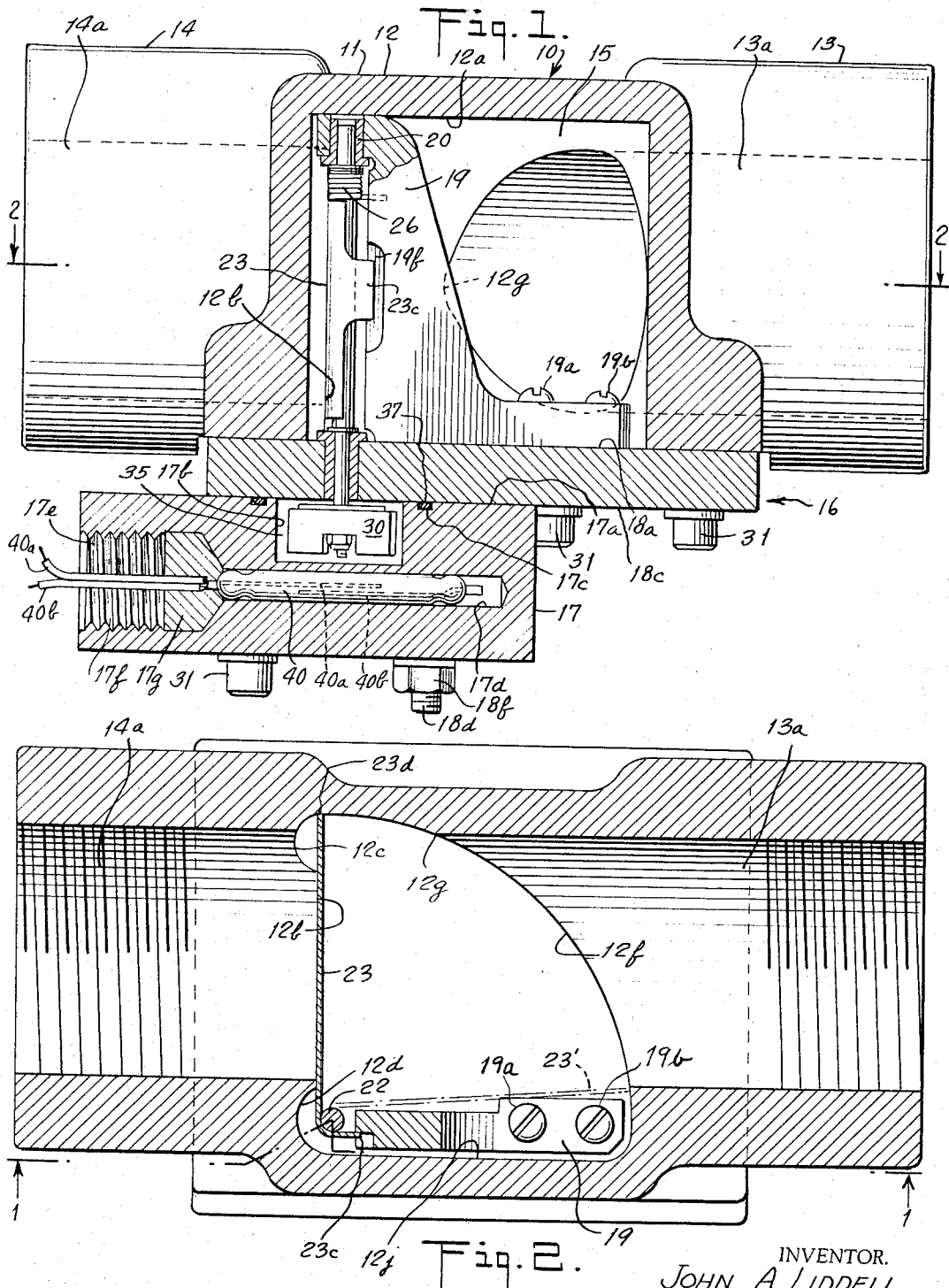

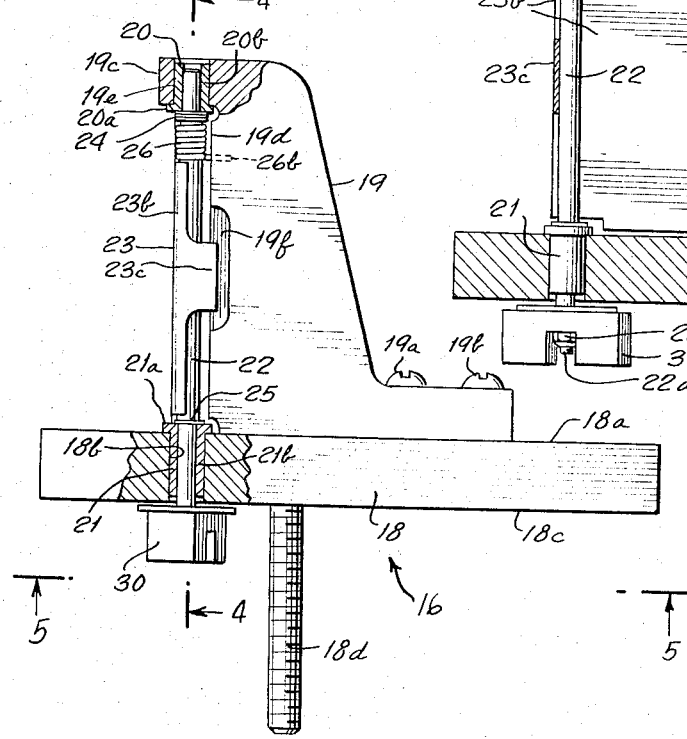
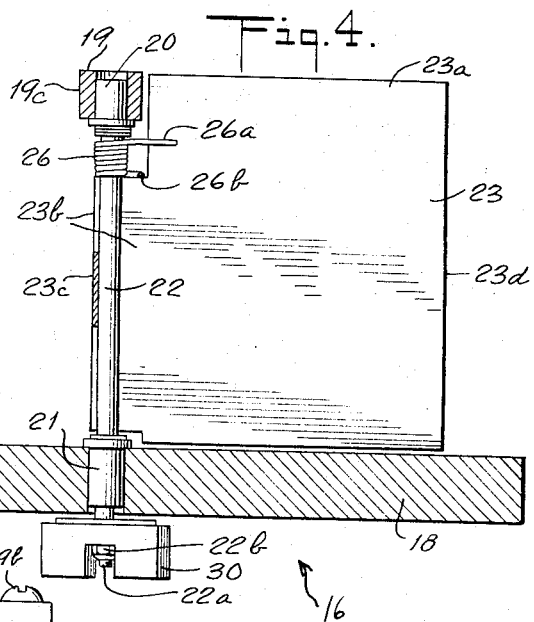
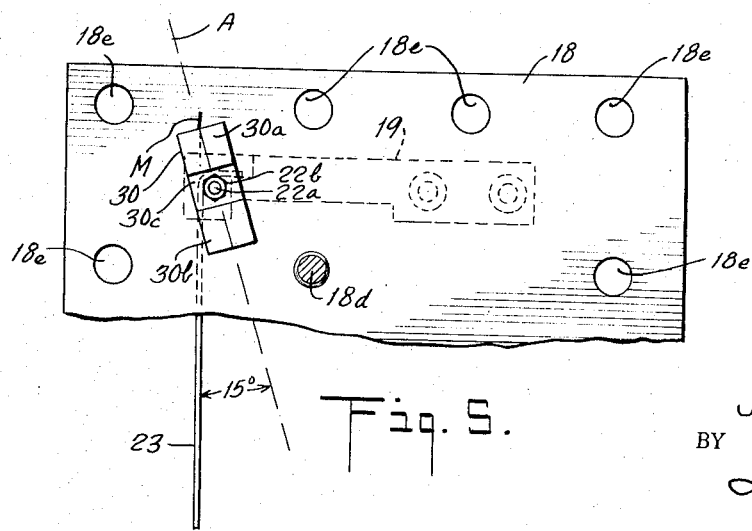

3,360,621
FLOW SWITCH HAVING HIGH SENSITIVITY AT LOW FLOW RATES
John A. Liddell, Wallingford, Conn., assignor to Revere Corporation of America, Wallingford, Conn., a corporation of New Jersey
Filed Aug. 20, 1965, Ser. No. 481,280
7 Claims. (Cl. 200—81.9)

This invention relates to fluid flow sensing apparatus, and more particularly relates to such apparatus adapted to operate an electric switch.

It is often desirable to have a means for sensing whether or not a certain predetermined minimum rate of flow exists in a closed fluid conduit. For example, in oil fields the crude petroleum often flows through fluid conduits under a variable pressure which may or may not at a given time cause any or a predetermined amount of fluid flow. Indication of whether or not a predetermined minimum rate of flow has been attained is rendered extremely difficult when the rate concerned is extremely low, e.g. less than ten linear feet per minute. However, in many applications, including in the transport by conduit of crude petroleum, such rates must be sensed.

With prior art flow switch constructions, correct operation at such low flow rates is rendered impossible when the fluid in question is laden with destructive substances. Continuing with the oil field example, crude petroleum contains many entrained substances, such as sand, sludge, ferrous scale particles from underground and aboveground piping, and the like. In addition, crude petroleum includes many paraffinic substances which tend to coat mechanical parts and create sludge which impedes sensitive mechanical operation or changes the sensitvity of that operation. Heretofore, neither adequate sensitivity at these low flow rates, nor sufficient durability of the flow switch parts in the face of such hostile substances, has been attained.

It is an object of the present invention to provide a flow switch which is sensitive to very low fluid flow velocities and at the same time is insensitive to abrasive and gumming substances in the fluid.

Another object of the invention is to provide an improved flow switch suitable for long-term use with high reliability in oil field fluid transmission applications.

Another object of the invention is to provide such a flow switch which prevents the agglomeration of ferrous particles upon a magnetic portion of the flow switch mechanism.

Another object of the invention is to provide such a flow switch which is insensitive to attitude.

Another object of the invention is to provide a flow switch construction which resists fouling by entrained abrasive particles or by paraffinic substances in crude oil, and which includes self-cleaning features.

Another object of the invention is to provide an improved flow switch for the production of an electrical signal to indicate the attainment of a predetermined minimum fluid flow velocity.

Another object of the invention is to provide a flow switch the parts of which are mounted as a unit for easy installation and/or removal for repair or replacement or for changing the setting of the control point.

These and other objects and advantages of the invention will be more fully appreciated as a detailed description of one presently preferred but merely illustrative embodiment of the invention is set forth hereinafter with reference to the figures, wherein:

FIG. 1 is a sectional elevation view of a flow switch according to the invention showing internal details of construction;

FIG. 2 is a sectional plan view of the apparatus shown in FIG. 1 and taken along plane 2—2 therein;

FIG. 3 is a detail partial section view of a portion of the apparatus shown in FIGS. 1 and 2;

FIG. 4 is a partial section view of the apparatus shown in FIG. 3 taken along plane 4—4 therein; and FIG. 5 is a fragmentary bottom view of the apparatus shown in FIG. 3.

Briefly, the invention includes provision of a closure means for a chamber within a fluid conduit, which closure has mounted to it as an integral unit all the parts comprising the active portions of a flow switch, and wherein a flow sensing vane is arranged so as to prevent flow-by of the fluid being measured until an appreciable degree of movement of the vane has occurred thereby to provide high sensitivity of operation, and wherein a magnetized body for actuation of a switch through an intervening barrier is mounted within an auxiliary chamber separate from the main chamber containing the vane in the fluid flow conduit, the means for connecting the vane and the magnetic body for movement of the latter in response to the former being sealed sufficient to prevent gross solid particles from entering the auxiliary chamber, yet being adapted to admit fluid from the main chamber into the auxiliary chamber to form a static body of fluid which seals the auxiliary chamber off from further flow to or from the main chamber.

Referring now to the figures, a flow switch according to the invention is indicated generally at 10 in FIGS. 1 and 2, and the active parts thereof are shown mounted as a sub-assembly in FIGS. 3–5 inclusive. Flow switch 10 comprises a housing 11 which includes a main chamber shell 12 and a pair of opposed fluid conduit fittings 13 and 14. The main chamber shell 12 and the fittings 13 and 14 are preferably formed integrally, as from a solid bar or cast stock. Any material which is consistent with the nature of the fluid and the temperature and pressure, may be employed. Stainless steel or bronze are preferred. Main chamber shell 12 defines a main chamber 15, and the respective fluid conduit fittings 13 and 14 include a pair of internally threaded orifices 13a and 14a which communicate with chamber 15 at a pair of throats 13b, 14b. The main chamber 15 is closed at its lowermost portion by a closure plate assembly 16 which carries a switch housing 17.

Referring now specifically to FIGS. 3 and 4, the closure plate assembly 16 includes a generally rectangular closure plate 18 which serves to mount the active elements of the apparatus, and also serves to close the bottom of chamber 15 when secured to main chamber shell 12. A vane support bracket 19 is secured to closure plate 18 at the upper surface 18a thereof by screws 19a, 19b so as to extend perpendicularly upward from plate 18 near one lateral edge thereof. At the uppermost portion thereof, vane support bracket 19 includes a laterally extending arm 19c which projects perpendicularly out from a vertical surface 19d of support bracket 19. Within laterally extending arm 19c is a vertical aperture 19e, and directly below laterally extending portion 19c is an aperture 18b in closure plate 18. The aperture 19e and the aperture 18b are coaxial. Carried within aperture 19e is a bearing 20 which includes a flange 20a which bears against the lower edge of aperture 19e and a sleeve portion 20b that extends upwardly in aperture 19e. Carried within aperture 18a is a similar bearing 21 which includes a flange 21a which bears against the upper plate surface 18a, and a sleeve portion 21b that extends downwardly in aperture 18b almost to a lower plate surface 18c. The bearings 20, 21 are fabricated from any suitable bearing material, an inert plastic such as poly-tetrafluoroethylene being preferred.

Carried for rotation within bearing sleeves 20b and 21b is a shaft 22. A vane 23 is secured to the portion of shaft 22 extending between bearings 20 and 21. Vane 23, as may best be seen in FIG. 4, includes a rectangular portion 23a having a height approximately equal to the height of the uppermost portion of support bracket 19, and a lateral connecting portion 23b having reduced height and a slightly reduced depth. The lateral connecting portion 23b is wrapped around shaft 22 for approximately a quarter-turn (FIG. 3), and is secured thereto by appropriate means, e.g. by soldering or welding. A tab 23c extends tangentially from lateral connecting portion 23b for a purpose to be hereinafter described. At the upper portion of shaft 22 is carried a shim 24 which rides against the flange 20a of bearing 20, and at the lowermost portion of shaft 22 is carried a shim 25 which rides against the flange 21a of bearing 21. The shaft 22 is thereby secured between bearings 20 and 21 for rotation therein.

Vane 23 may be moved from the extreme position shown in full outline in FIGS. 2–4 through approximately 90° of clockwise rotation (as viewed in FIG. 2) to another extreme position shown in broken outline at 23' in FIG. 2. As will be explained hereinbelow, these extreme positions of vane 23 correspond to the no-flow and full-flow positions, respectively. A return spring 26 is mounted coaxially with the upper portion of shaft 22 between shim 24 and the upper extreme of lateral connecting portion 23b of vane 23, and has a pair of ends 26a and 26b which are disposed at right angles to each other (FIG. 4) when vane 23 is in the full outline position shown in FIG. 2. Vane 23 and support bracket 19 have adjacent facing surfaces which are normally disposed 90° apart as aforesaid and which are brought into contact (FIG. 2) when vane 23 is rotated to the broken line position 23'. End 26a of the return spring 26 rests against the surface of vane 23 which faces support bracket 19, and end 26b of return spring 26 rests against the surface of support bracket 19 which faces vane 23. Return spring 26 thereby urges vane 23 to rotate with shaft 22 until (as viewed in FIG. 4) vane 23 is stopped by the engagement of vane tab 23c with a depressed surface 19f in support bracket 19. As will appear hereinafter, vane tab 23c acts as a stop only when the plate assembly 16 is disengaged from the flow switch 10 as illustrated in FIGS. 3–5. In the assembled condition the vane 23 is stopped by engagement with a portion of housing 11 (FIGS. 1 and 2). When vane 23 is forced to rotate with shaft 22 away from the aforesaid stopped position the return spring 26 is torqued, thereby to return the vane 23 to the illustrated stopped position when the disturbing force is removed.

Lower bearing 21 provides a close but freely rotatable fit for the lower end of shaft 22 so that gross solid materials cannot pass from plate surface 18a along the interface between bearing 21 and shaft 22 to plate surface 18c, for a purpose to be presently described. Employment of the aforesaid poly-tetrafluoroethylene as the preferred bearing material ensures that the bearing 21 will be inert to the substances carried by the fluid being transported, and that the sludge and paraffinic substances will not adhere thereto. Additionally, it ensures that shaft 22 will be freely rotatable within the bearing sleeve 21 despite the aforesaid close fit, due to the well known lubricity of such bearings. While a bearing 21 fabricated entirely in poly-tetrafluoroethylene is preferred, other expedients may be substituted. For example, a metal sleeve bearing 21 having a poly-tetrafluoroethylene coating on the inner bore thereof may be employed, or a polyamide (e.g. Nylon) bearing 21 may be employed, or an appropriate metal sleeve bearing may be employed.

At the lower extreme of shaft 22, below plate surface 18c, is secured a U-shaped magnet 30 having a pair of pole members 30a and 30b directed downwardly away from plate 18, and a central portion 30c engaged with shaft 22 for rotation therewith. Magnet 30 is secured to a threaded end 22a of shaft 22 by a nut 22b, so that the angular position of the axis A through the poles 30a, 30b may be selectively fixed relative to the position of vane 23 on shaft 22. In the illustrated condition (FIG. 5) the axis A is secured on shaft 22, 15° ahead of the angular position of vane 23. The magnet 30 acts as an actuating member for a switch assembly to be presently described, and the adjustment of the angular position of magnet 30 affects the operation of the switch, as will presently be described. Also at the lower surface 18c of plate 18 is an elongated threaded stud 18d which is threadedly secured therein and which depends downwardly therefrom. The stud 18d acts as an expedient in assembling the parts making up the flow switch 10 and in correctly locating the various parts into their respective positions relative to one another. Arranged around the periphery of plate 18 are 12 equi-spaced apertures 18e, six of which may be seen in the fragmentary view of FIG. 5. The three apertures 18e closest to shaft end 22a, together with stud 18d, describe a rectangle (FIG. 5) with shaft end 22a at the center thereof.

Referring now also to FIGS. 1 and 2, there is shown the closure plate assembly 16 secured to the housing 11, so that the vane 23 is enclosed within the main chamber 15, to close off throat 14b (FIG. 2) when in the position shown in full outline. The main chamber 15 is formed to accommodate closely the solid of revolution swept out by the plane of vane 23 during its movement between the position indicated at 23 in full outline and the position indicated at 23' in broken outline. Specifically, main chamber 15 is bounded at its upper portion by a planar main chamber wall 12a, and is bounded at its lower portion by the planar upper surface 18a of plate 18, wall 12a and surface 18a being essentially parallel. At the portion of main chamber 15 intersected by throat 14b the main chamber 15 is bounded by a planar wall 12b which is mutually perpendicular to wall 12a and surface 18a. At the extreme lateral portions of wall 12b is included a pair of semi-cylindrical wall surfaces 12c and 12d which extend vertically between wall 12a and surface 18a. Surface 12c intrudes upon and is intersected by one lateral extreme of throat 14b, and surface 12d is displaced adjacent to the other lateral extreme of throat 14b, and is not intersected thereby.

An arcuate wall 12f extends from semi-cylindrical surface 12c approximately 90° to the opposite lateral wall of main chamber shell 12, adjacent the end of support bracket 19 away from shaft 22. Arcuate wall 12f extends vertically between wall 12a and surface 18a and has a radius slightly greater than that of vane 23 on shaft 22, so that there is a very slight clearance between the extreme vertical edge 23d of vane 23 and wall 12f, for the purpose of allowing free rotation of vane 23 on shaft 22. The portion of arcuate wall 12f between semi-cylindrical surface 12c and edge 12g is unbroken, so that essentially no flow-by is possible when vane 23 lies within those arcuate limits. Adjacent support bracket 19 is a planar lateral wall 12j which connects semi-cylindrical surface 12d and arcuate wall 12f.

Closure plate assembly 16 is secured to the lower portion of main chamber shell 12 by twelve machine screws 31 (FIG. 1) which extend through each of the apertures 18e for threaded engagement with corresponding apertures in the body of central chamber portion 12. As will be described hereinbelow, three of screws 31 extend also through switch housing 17. When closure plate assembly 16 is so secured the vane support bracket 19 is positioned within interior chamber 15 so that the uppermost portion thereof rests against the upper wall 12a of interior chamber 15. Thus the laterally extending arm 19c of vane support bracket 19 is positioned within the space embraced by semi-cylindrical surface 12d, shaft 22 thereby being positioned vertically along surface 12d. Vane 23 is urged by spring 26 to lie flush along planar surface 12b so that there is contact between all of the periphery of the intersection of throat 14b and chamber 15, except at the intersection of semi-cylindrical surface 12c with throat 14b.

All the surfaces that lie within chamber 15 are coated with a sludge resistant compound. A polytetrafluoroethylene dispersion coating is preferred, and this material is inert as well as having lubricity sufficient to resist deposition of organic or inorganic substances. Thus, all of the chamber 15 walls such as 12a–12f are so coated, as well as surface 18a of closure plate assembly 16. Additionally, the parts supported on closure plate assembly 16 are so coated, specifically, the bracket 19, the vane 23, and the shaft 22. The operation of the invention is such as to be self-cleaning and resistant to sludge and entrained solid particles, as will presently be described, and the coating of all the surfaces in main chamber 15 is practiced to be consistent with these advantages of the invention.

It will be appreciated that when fitting 14 is connected to a fluid source to cause flow through throat 14b and against vane 23, there is no path for fluid escape or flow-by until vane 23 turns with shaft 22 far enough to reach edge 12g, after which there is increasing fluid flow-by, to the extent required, and full flow operation occurs when vane 23 is turned all the way to the broken line position 23'. Since there is no opportunity for flow-by until the edge 12g is reached, the full pressure of any flow that may be impinging on vane 23 from throat 14b is reflected in turning torque at spring 26 during the angular vane travel from the solid outline position up to edge 12g. The spring constant of spring 26 may be chosen to allow turning of vane 23 in the clockwise direction toward edge 12g (as viewed in FIG. 2) under the urging of as small a flow as it is desired to sense. The only limitation upon ease of turning of vane 23 is that it is desirable that spring 26 be strong enough to return vane 23 fully to its normally closed position upon the termination of such flow. Since essentially no flow-by can occur past vane 23 until it reaches and passes point 12g, vane 23 may be made to turn through that angle in response to very slight fluid pressures in throat 14b on vane 23, corresponding to very low rates of fluid flow. It is a feature of the invention that flow-by does not occur until the pressure has been employed to turn vane 23 through an appreciable angle of rotation. Great sensitivities are thus made possible, depending only on the spring constant of spring 26. This is accomplished without compromise of full flow characteristics, since vane 23 can turn all the way to position 23' if required by the fluid flow. Flow from throat 14b to throat 13b, under that condition, unrestricted.

As previously mentioned, spring 26 must be strong enough to return vane 23 to the normal closed position upon the termination of flow. However, this requirement does not prevent the use of very light springs 26, since the invention provides features which operate to make return of vane 23 easy. It will be remembered that the coating on all the main chamber parts resists the build up of sludge. Therefore, while the return sweep of vane 23 may carry before it solid or semi-solid particles of entrained materials, they will be wiped away from surface 12f and into the space embraced by semi-cylindrical surface 12c so that they cannot impede the flush reseating of vane 23 against planar surface 12b. It is important that vane 23 completely reseat so that maximum response to pressure increase at throat 14b is obtained, and so that the full angular travel of vane 23 from its closed position to point 12g is retained, thereby retaining the full range of motion at the electrical switch, to be described presently. Thus, the self-cleaning feature of the inventive configuration ensures that maximum sensitivity will be obtained on each sensing motion of vane 23 despite long periods of service during which entrained matter accumulates.

Switch housing 17 is generally rectangular in cross-section and includes four vertical apertures therein. One of these apertures is engaged with elongated stud 18d of plate 18 and is secured by a nut 18f. The stud 18d thereby positively connects and precisely locates the switch housing 17 relative to the plate 18. One or more pins (not shown) may also be employed to locate switch housing 17 on the surface 18c of plate 18. The other three apertures in switch housing 17 are coaxial with the aforesaid three apertures 18e in plate 18 (FIG. 5) which, with stud 18d, form a rectangle about shaft 22. As has already been indicated generally, three of the aforesaid twelve machine screws 31 are longer than the others and pass through the three apertures in switch housing 17, and through the three apertures 18e in plate 18, for threaded engagement within main chamber shell 12. The switch housing 17 is thereby secured directly to central chamber portion 12 by three machine screws 31 and is secured directly to closure plate assembly 16 by stud 18d and nut 18f.

It is a feature of the invention that when all twelve machine screws 31 are removed, closure plate assembly 16 may be removed from main chamber 15 as a unit, for repair or replacement of parts carried thereby. It is another feature of the invention that when the three screws 31 through switch housing 17 are removed, and nut 18f is removed from stud 18d, switch housing 17 may be removed from closure plate assembly 16 without exposing main chamber 15. This means that the switch housing 17 may be replaced, or the magnet 30 may be made accessible, without shutting down the flow in main chamber 15. The advantage of such access to magnet 30 will appear hereinbelow in connection with description of the adjustment thereof on shaft 22.

The upper surface 17a of switch housing 17 is mated flushly with the lower surface 18c of plate 18, and includes a cylindrical depressed portion 17b which cooperates with the surface of the plate 18 to define an auxiliary chamber 35 which is of sufficient diameter and depth to accommodate magnet 30 with large clearances at all portions thereof. Depressed cylindrical portion 17b is surrounded by a ring depression 17c in the upper surface 17a of switch housing 17, and an O-ring gasket 37 is carried therein to seal auxiliary chamber 35 when surfaces 18c and 17a are mated. Directly underneath auxiliary chamber 35 is a small cylindrical bore 17d, the center line of which is intersected by the axis of rotation of shaft 22. A large diameter countersunk bore 17e is formed at one end of switch housing 17, and includes an internally threaded portion 17f. Carried within cylindrical core 17d is a reed-type SPST switch 40, having a pair of reed-contacts 40a, 40b, adapted to be actuated by external change in magnetic flux pattern. Such switches are known, and are glass enclosed and hermetically sealed. Their action is such as to respond to the angular position of a U-shaped magnet, the poles of which are rotated in close proximity thereto, by opening and closing the reed-contacts 40a, 40b depending upon the angular position of the magnet and thus the magnetic flux pattern. While a SPST reed-type switch is preferred, any other switch which will respond to rotation of a magnetic element in the manner described may be employed.

As is illustrated, the bore 17d passes quite close to the auxiliary chamber 35, but the two cavities are nevertheless separated by a solid portion of switch housing 17, so that nothing except the magnetic flux of magnet 30 may pass from auxiliary chamber 35 to bore 17d. The switch 40 includes a pair of leads 40a, 40b, which pass out of switch housing 17 through threaded orifice 17e. The threaded orifice 17e is potted at the innermost portion thereof with a suitable potting material 17g (e.g. an epoxy resin) so that switch 40 is properly protected against moisture and shocks and the like. The outer internally threaded portion 17f of orifice 17e may be threadedly engaged with a closure fitting (not shown) carried coaxially on leads 40a, 40b, to close off that end of switch housing 17 from extraneous materials and influences.

When fluid is introduced into orifice 14a of the fluid switch 10 under sufficient pressure to cause flow, the vane 23 will be displaced in the clockwise direction as viewed in FIG. 2 and when it reaches the edge 12g, it will have turned shaft 22 through approximately 20 angular degrees without losing any of the pressure of the fluid by flow-by. The parts will have been adjusted so that turning of magnet 30 through a certain angular distance will actuate switch 40. The normal use of the apparatus will be to close switch 40 upon the turning of vane 23 through that certain angle, i.e. upon the sensing of a predetermined minimum rate of flow. However, in some uses it may be desirable to effect opening of switch 40 at that certain angle, i.e. upon sensing of the predetermined minimum rate of flow. The point at which switch 40 is actuated can of course be adjusted and need not occur at edge 12g. Thus, while it is advantageous to have the actuation point at or before edge 12g, it can be set anywhere within the angular travel of vane 23. The vane 23 actuation angle can be easily reset by changing the angle (FIG. 5) between the axis A of magnet 30 and the orientation of the vane 23. The greater the advance of axis A ahead of vane 23, the less angular travel of vane 23 is required to actuate switch 40. Thus, adjustment of the angle between axis A and vane 23 adjusts the sensitivity of the apparatus, since the resistant force at spring 26 is proportional to displacement of vane 23. The sensitivity of the apparatus also can be altered by changing spring 26 to a spring of greater (less sensitive) or lesser (more sensitive) spring constant. For best results the spring constant and the angular position of magnet 30 on shaft 22 are mutually determined to give a predetermined degree of rotation of vane 23 to effectuate actuation of switch 40, in response to the predetermined minimum flow rate in question. Alternatively, a fixed permanent magnet may be mounted adjacent the switch 10, either to vary the sensitivity, to vary the set point, or to change the switch from normally open operation to normally closed. It will now be apparent why it is a feature of the invention, as aforesaid, to be able to remove switch housing 17 without removing closure plate assembly 16. Magnet 30 may thus be exposed so as to be loosened on shaft 22 and reoriented thereon for the aforesaid purpose of changing the sensitivity of the apparatus or changing the predetermined minimum rate of flow which will actuate switch 40, and this may be accomplished without draining or even exposing main chamber 15. For this purpose an index mark M may be provided on surface 18c to indicate the closed position of vane 23. The change in angular position of magnet 30 may then be made with reference to that index mark. The magnet 30 is also advantageously accessible for other purposes, such as cleaning or repair, or to check the orientation thereof when flow is occurring in main chamber 15. For this latter purpose a window (not shown) may be provided in switch housing 17, so that removal of housing 17 is not necessary.

As has already been mentioned, another important difficulty with prior art flow switches employing a magnetically actuated switch element has been that the magnet tends to accumulate the ferrous particles entrained in the fluid flow, and when fluids such as crude oil are being transmitted the rapid build-up of ferrous particles on the magnet radically changes the flux pattern emanating therefrom, thus rendering the operation of the switch erratic and unpredictable and inaccurate. Accordingly, it is an important feature of the present invention that magnet 30 is enclosed in the separate auxiliary chamber 35 and is not exposed to the fluid flow passing from orifice 14a through chamber 15 and out orifice 13a. When the fluid valve 10 according to the invention is first put into service, fluid will slowly find its way along shaft 22 and into auxiliary chamber 35, but the close and self-lubricated contact between auxiliary chamber 35 and bearing 21 will prevent any gross entrained particles from entering auxiliary chamber 35. Some very fine particles will however enter auxiliary chamber 35. These particles do not create any problem since they have been screened in size, and more particularly because as soon as auxiliary chamber 35 fills with liquid, it attains the pressure existing in chamber 15, and further fluid flow is not possible. Thus magnet 30 is not exposed to a constant supply of ferrous particles, and for all practical purposes is not exposed to any ferrous particles at all during its entire service life. This means that the superior sensitivity which is provided by the relationship of vane 23 to arcuate surface 12f is preserved during an extended period of use by the insulation of magnet 30 from the ferrous particles which in prior art construction quickly render the operation of the switch erratic. The combination of the mode of operation of vane 23 and the provision of an auxiliary chamber 35 from magnet 30 means that the apparatus according to the invention provides a much higher sensitivity in the first instance, and additionally preserves the sensitivity which it does provide for a very much longer time than prior art constructions preserved their more limited sensitivity.

What has been described is a flow switch of superior operating characteristics. Especially with solid entrained fluids, the present flow switch is more sensitive to the presence of low rates of fluid flow, and is very much more resistant to sludge, ferrous particles, etc. The flow switch is not sensitive to attitude, and has self-cleaning and ready-access features. Devices constructed according to the invention are a distinct advance in the art.

While an illustrative embodiment of the invention has been shown and described, the invention is not limited thereto. Those skilled in the art will readily perceive alternative embodiments that practice the inventive principles, and all such variations are included within the invention.

What is claimed is:
1. A flow switch comprising:
 (a) a chamber assembly, including
  (i) walls defining a main chamber,
  (ii) first and second throats respectively leading into and out of said main chamber, and
  (iii) a vane mounted within said main chamber having an area larger than the cross-sectional area of and biased to cover said first throat, and pivoted to be movable away from said first throat in an arcuate path in response to fluid pressure thereat,
   said walls being formed to conform closely to the solid of revolution described by said vane during an initial span of movement of said vane away from said first throat, for the essentially constant prevention of flow-by throughout that initial span of movement, and said second throat being disposed to intersect said main chamber at a wall location passed by said vane during a subsequent span of movement thereof away from said first throat; and
 (b) switch means responsive to the position of said vane relative to said first throat.
2. A flow switch comprising:
 (a) a chamber assembly, including
  (i) walls defining a main chamber,
  (ii) first and second throats respectively leading into and out of said main chamber, and
  (iii) a vane mounted within said main chamber, biased to cover said first throat, and pivoted to be movable away from said first throat in an arcuate path in response to fluid pressure thereat,
   said walls being formed to conform closely to the solid of revolution described by said vane during an initial span of movement of said vane away from said first throat, including an arcuate surface having radii minimally greater than the corresponding radii of said solid of revolution consistent with arcuate movement of said vane with respect to said arcuate surface, and said second throat being disposed to intersect said arcuate surface at a location beyond said initial span of vane movement but within the limits of movement of said vane away from said first throat; and (b) switch means responsive to the position of said vane relative to said first throat.

3. A flow switch comprising:
(a) a chamber assembly, including
 (i) walls defining a main chamber,
 (ii) first and second opposed throats respectively leading into and out of said main chamber, and
 (iii) a vane assembly including
  a shaft mounted for rotation within said chamber located outside the fluid path between said throats,
  a vane fixed to said shaft for pivotal motion therewith, biased to cover said first throat at one extreme of the span of movement thereof, and movable against said bias by fluid flow pressure at said first throat to a second extreme wherein said vane is out of the fluid path between said throats,
   said walls being formed to conform closely to the solid of revolution described by said vane during an initial span of movement of said vane away from said first throat, including an arcuate surface having radii minimally greater than the corresponding radii of said solid of revolution consistent with arcuate movement of said vane with respect to said arcuate surface, and said second throat being disposed to intersect said arcuate surface at a location beyond said initial span of vane movement but within the limits of movement of said vane away from said first throat; and
(b) switch means responsive to the position of said vane relative to said first throat.

4. A flow switch according to claim 2, wherein said walls include a removable portion, and wherein said vane is mounted to that removable wall portion for said biased pivotal motion, whereby removal of said removable wall portion yields integral access to said vane.

5. A flow switch according to claim 1 wherein the parts of and within the said main chamber are coated with a poly-tetrafluoroethylene dispersion coating.

6. A flow switch according to claim 2, wherein said arcuate surface is terminated adjacent said first throat by a recessed wall portion, whereby solid and semi-solid materials wiped back by said vane on the return thereof to said first throat can accumulate, and said vane may seat flushly to cover said first throat.

7. A flow switch comprising:

(a) a chamber assembly, including
 (i) walls defining a main chamber,
 (ii) first and second throats respectively leading into and out of said main chamber, and
 (iii) a vane mounted within said main chamber, biased to cover said first throat, and pivoted to a shaft for movement away from said first throat in an arcuate path in response to fluid pressure thereat,
  said walls being formed to conform closely to the solid of revolution described by said vane during an initial span of movement of said vane away from said first throat, including an arcuate surface having radii minimally greater than the corresponding radii of said solid of revolution consistent with arcuate movement of said vane with respect to said arcuate surface, and said second throat being disposed to intersect said arcuate surface at a location beyond said initial span of vane movement but within the limits of movement of said vane away from from said first throat; and
(b) an auxiliary chamber assembly, including
 (i) walls defining a closed auxiliary chamber, separate from said main chamber,
 (ii) bearing means leading from said main chamber to said auxiliary chamber, adapted closely to retain said shaft for rotation therein, and forming a seal therewith sufficient to prevent gross solid particles from entering said auxiliary chamber from said main chamber, yet being adapted to admit fluid from said main chamber to said auxiliary chamber until the latter is filled therewith,
 (iii) a magnetized body carried within said auxiliary chamber and fixed to said shaft to be movable in response to movement of said vane, and
 (iv) a magnetically sensitive switch located outside said auxiliary chamber in close proximity thereto, adapted to be actuated at a predetermined position of said permanently magnetized body and thereby of said vane.

References Cited

UNITED STATES PATENTS

| | | | |
|---|---|---|---|
| 2,103,747 | 12/1937 | Hamilton | 200—81.9 |
| 2,203,331 | 6/1940 | Hinsch | 200—81.9 |
| 2,307,304 | 1/1943 | Rudd | 200—81.9 |
| 3,165,605 | 1/1965 | Dietz | 200—81.9 |

BERNARD A. GILHEANY, *Primary Examiner.*

H. BROOME, *Assistant Examiner.*